(12) United States Patent
Pan et al.

(10) Patent No.: US 12,341,911 B2
(45) Date of Patent: Jun. 24, 2025

(54) CERTIFICATE REVOCATION LIST UPDATING METHOD AND RELATED DEVICE

(71) Applicant: Shenzhen Yinwang Intelligent Technologies Co., Ltd., Shenzhen (CN)

(72) Inventors: Kai Pan, Shanghai (CN); Jing Chen, Shanghai (CN); Xiaojun Wang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 17/831,136

(22) Filed: Jun. 2, 2022

(65) Prior Publication Data
US 2022/0294649 A1   Sep. 15, 2022

Related U.S. Application Data

(63) Continuation of application No. PCT/CN2020/113299, filed on Sep. 3, 2020.

(30) Foreign Application Priority Data

Dec. 6, 2019   (CN) .......................... 201911240387.7

(51) Int. Cl.
*H04L 9/32* (2006.01)
*H04L 9/08* (2006.01)
*H04L 9/40* (2022.01)

(52) U.S. Cl.
CPC .......... *H04L 9/3268* (2013.01); *H04L 9/0891* (2013.01); *H04L 63/0823* (2013.01); *H04L 2209/80* (2013.01); *H04L 2209/84* (2013.01)

(58) Field of Classification Search
CPC ...................................................... H04L 9/3268
See application file for complete search history.

(56) References Cited

U.S. PATENT DOCUMENTS

| 10,503,893 | B2 * | 12/2019 | Hsu ......................... G06F 21/45 |
| 2011/0191581 | A1 * | 8/2011 | Shim ....................... H04L 67/12 |
| | | | 713/158 |

(Continued)

FOREIGN PATENT DOCUMENTS

| CN | 103812605 A | 5/2014 |
| CN | 104053149 A | 9/2014 |

(Continued)

OTHER PUBLICATIONS

ETSI MCC, "Report of 3GPP TSG RAN2#105bis meeting, Xi'an, China," 3GPP TSG-RAN WG2 meeting #106 R2-1905501, Apr. 8-12, 2019, 225 pages.

(Continued)

*Primary Examiner* — Bradley W Holder
(74) *Attorney, Agent, or Firm* — Conley Rose, P.C.

(57) ABSTRACT

A certificate revocation list updating method includes determining by a first road side unit (RSU), based on a first certificate revocation list stored by the first RSU, that a certificate used by a first on board unit (OBU) in a coverage area of the first RSU is revoked, sending, by the first RSU, a first notification message to one or more OBUs in the coverage area of the first RSU, where the first notification message notifies the one or more OBUs to update a certificate revocation list.

15 Claims, 4 Drawing Sheets

(56) References Cited

U.S. PATENT DOCUMENTS

| | | |
|---|---|---|
| 2014/0289512 A1 | 9/2014 | Tseng et al. |
| 2017/0063842 A1* | 3/2017 | Ahn ..................... H04L 63/123 |
| 2017/0277884 A1 | 9/2017 | Hsu et al. |
| 2018/0159693 A1* | 6/2018 | Condeixa ............ H04L 63/0823 |

FOREIGN PATENT DOCUMENTS

| | | |
|---|---|---|
| CN | 104901921 A | 9/2015 |
| EP | 2579498 A1 | 4/2013 |
| EP | 2916518 A1 | 9/2015 |
| EP | 2942921 A1 | 11/2015 |
| WO | 2018221805 A1 | 12/2018 |

OTHER PUBLICATIONS

Kastuv M. Tuladhar et al., "Efficient and Scalable Certificate Revocation List Distribution in Hierarchical VANETs," 2018, 6 pages.

Huawei et al.,"V2I with Service RSU," S1-150144, 3GPP TSG-SA WG1 Meeting #69, Sanya, P.R. China, Feb. 2-6, 2015, 2 Pages.

* cited by examiner

CERTIFICATE REVOCATION LIST UPDATING METHOD AND RELATED DEVICE

CROSS-REFERENCE TO RELATED APPLICATIONS

This application is a continuation application of International Patent Application No. PCT/CN2020/113299, filed on Sep. 3, 2020, which claims priority to Chinese Patent Application No. 201911240387.7, filed on Dec. 6, 2019. The disclosures of the aforementioned applications are hereby incorporated by reference in their entireties.

TECHNICAL FIELD

This application relates to the internet of vehicles field, and in particular, to a certificate revocation list updating method and a related device.

BACKGROUND

A certificate revocation list (CRL) is used to determine whether a certificate used by a sender is revoked. In conventional certificate-based computer communication, any two computers connected to a network can communicate with each other. Therefore, each computer needs to store a CRL. However, in an internet of vehicles environment, it cannot be ensured that a CRL stored in each vehicle is updated in a timely manner, or signaling overheads are very high because a CRL is frequently updated.

SUMMARY

Embodiments of this application provide a certificate revocation list updating method and a related device, so that timely updating of a certificate revocation list can be ensured, and signaling overheads can also be reduced.

According to a first aspect, an embodiment of this application provides a certificate revocation list updating method, including a first road side unit (RSU) determines, based on a first certificate revocation list stored by the first RSU, that a certificate used by a first on board unit (OBU) in a coverage area of the first RSU is revoked. The first RSU sends a first notification message to one or more OBUs in the coverage area of the first RSU, where the first notification message is used to notify the one or more OBUs to update a certificate revocation list. After it is determined that the certificate used by the first OBU in the coverage area of the first RSU is revoked, the notification message is sent to trigger the OBU to update the certificate revocation list, so that timely updating of the certificate revocation list can be ensured, and signaling overheads can also be reduced.

In a possible design, the first notification message includes the first certificate revocation list, and the first certificate revocation list is used to update a second certificate revocation list stored by the one or more OBUs. The first certificate revocation list included in the first notification message is used to update the certificate revocation list stored by the OBU, so that timely updating of the certificate revocation list can be ensured, and signaling overheads can also be reduced.

In another possible design, the first notification message is used to trigger the one or more OBUs to request a latest certificate revocation list from the certificate server. The first notification message is used to trigger the OBU to request the latest certificate revocation list for updating, so that timely updating of the certificate revocation list can be ensured, and signaling overheads can also be reduced.

In another possible design, the first RSU receives a message sent by the first OBU. When a certificate used for the message is one of at least one certificate corresponding to the first certificate revocation list, the first RSU determines that the certificate used by the first OBU is revoked. The certificate used for the message sent by the first OBU is checked, to ensure validity of the message.

In another possible design, the first RSU receives the first certificate revocation list from the certificate server. The first certificate revocation list is received from the certificate server, to ensure that the certificate revocation list stored by the RSU can be updated in a timely manner.

In another possible design, the first RSU sends a second notification message to a second RSU, where the second notification message is used to indicate to the second RSU that the certificate used by the first OBU is revoked. After receiving the second notification message, the second RSU may learn that the certificate used by the first OBU is revoked, determine that a vehicle to which the first OBU belongs is an unauthorized vehicle, and stop exchanging information with the vehicle, to ensure validity of information exchange.

In another possible design, the first RSU sends a request message to the certificate server, and receives a response message sent by the certificate server, where the response message includes another certificate related to the revoked certificate of the first OBU. In this way, all revoked certificates of the first OBU are obtained. This can prevent the first OBU from exchanging information by using any revoked certificate.

In another possible design, the first RSU may first send the first notification message, and then send the second notification message, or the first RSU may first send the second notification message, and then send the first notification message.

It should be noted that, after receiving a message sent by an OBU in an area in which the OBU is located, if the first RSU determines that a certificate used for the message is revoked, the first RSU sends a notification message to the OBU in the area, to trigger the OBU in the area to update a certificate revocation list. Alternatively, the first RSU may broadcast a latest certificate revocation list to the OBU in the area at a preset time interval without triggering, so that the OBU in the area updates a certificate revocation list. In this embodiment of this application, the OBU may update the certificate revocation list in the foregoing two manners.

According to a second aspect, an embodiment of this application provides a certificate revocation list updating method, including an OBU receives a first notification message sent by a first road side unit RSU, where the first notification message is used to indicate to update a certificate revocation list. The OBU updates the certificate revocation list. The notification message is received to trigger the OBU to update the certificate revocation list, so that timely updating of the certificate revocation list can be ensured, and signaling overheads can also be reduced.

In another possible design, the first notification message includes a first certificate revocation list. The OBU updates a currently stored certificate revocation list to the first certificate revocation list. The first certificate revocation list included in the first notification message is used to update the certificate revocation list stored by the OBU, so that timely updating of the certificate revocation list can be ensured, and signaling overheads can also be reduced.

In another possible design, the OBU sends a first request message to a certificate server, the OBU receives a latest certificate revocation list from the certificate server, and the OBU updates a currently stored certificate revocation list to the latest certificate revocation list. The latest certificate revocation list is requested from the certificate server for updating, so that timely updating of the certificate revocation list can be ensured, and signaling overheads can also be reduced.

In another possible design, the OBU sends a second request message to the first RSU, and the OBU receives a first certificate revocation list from the first RSU, and updates a currently stored certificate revocation list to the first certificate revocation list. The first certificate revocation list is requested from the first RSU for updating, so that timely updating of the certificate revocation list can be ensured, and signaling overheads can also be reduced.

In another possible design, the OBU sends a confirmation request to the certificate server, where the confirmation request is used to request the certificate server to confirm whether a certificate used by the first OBU is revoked. The OBU receives a response message sent by the certificate server. The certificate server confirms whether the certificate used by the first OBU is revoked, so that accuracy of information exchange is improved.

In another possible design, the OBU may store only a certificate revocation list in an area (for example, a city or an administrative region) in which the OBU is located, and does not need to store a certificate revocation list in an entire network. Each time the OBU updates a certificate revocation list, the OBU only needs to request to update the certificate revocation list in the area. In this way, storage overheads can be reduced, and a query speed can be improved.

According to a third aspect, an embodiment of this application provides a certificate revocation list updating apparatus. The certificate revocation list updating apparatus is configured to implement the method and the functions performed by the first RSU according to the first aspect, and is implemented by hardware/software. The hardware/software includes modules corresponding to the foregoing functions.

According to a fourth aspect, an embodiment of this application provides another certificate revocation list updating apparatus. The certificate revocation list updating apparatus is configured to implement the method and the functions performed by the OBU according to the second aspect, and is implemented by hardware/software. The hardware/software includes modules corresponding to the foregoing functions.

According to a fifth aspect, an embodiment of this application provides a first RSU, including a processor, a memory, and a communications bus. The communications bus is configured to implement connection and communication between the processor and the memory, and the processor executes a program stored in the memory to implement the steps according to the first aspect.

In a possible design, the first RSU provided in this application may include a corresponding module configured to perform the behavior of the first RSU in the foregoing method design. The module may be software and/or hardware.

According to a sixth aspect, an embodiment of this application provides an OBU, including a processor, a memory, and a communications bus. The communications bus is configured to implement connection and communication between the processor and the memory, and the processor executes a program stored in the memory to implement the steps according to the second aspect.

In a possible design, the OBU provided in this application may include a corresponding module configured to perform the behavior of the OBU in the foregoing method design. The module may be software and/or hardware.

According to a seventh aspect, an embodiment of this application provides a computer-readable storage medium. The computer-readable storage medium stores instructions, and when the instructions are run on a computer, the computer is enabled to perform the methods according to the foregoing aspects.

According to an eighth aspect, an embodiment of this application provides a computer program product including instructions. When the computer program product runs on a computer, the computer is enabled to perform the methods according to the foregoing aspects.

According to a ninth aspect, an embodiment of this application provides a chip, including a processor, configured to invoke, from a memory, instructions stored in the memory and run the instructions, so that an OBU or a first RSU in which the chip is installed performs the method according to any one of the foregoing aspects.

According to a tenth aspect, an embodiment of this application provides a certificate revocation list updating system, including a road side unit RSU and a certificate server. The RSU includes the certificate revocation list updating apparatus according to the third aspect.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

The following describes embodiments of this application with reference to the accompanying drawings in embodiments of this application.

Figure 1:
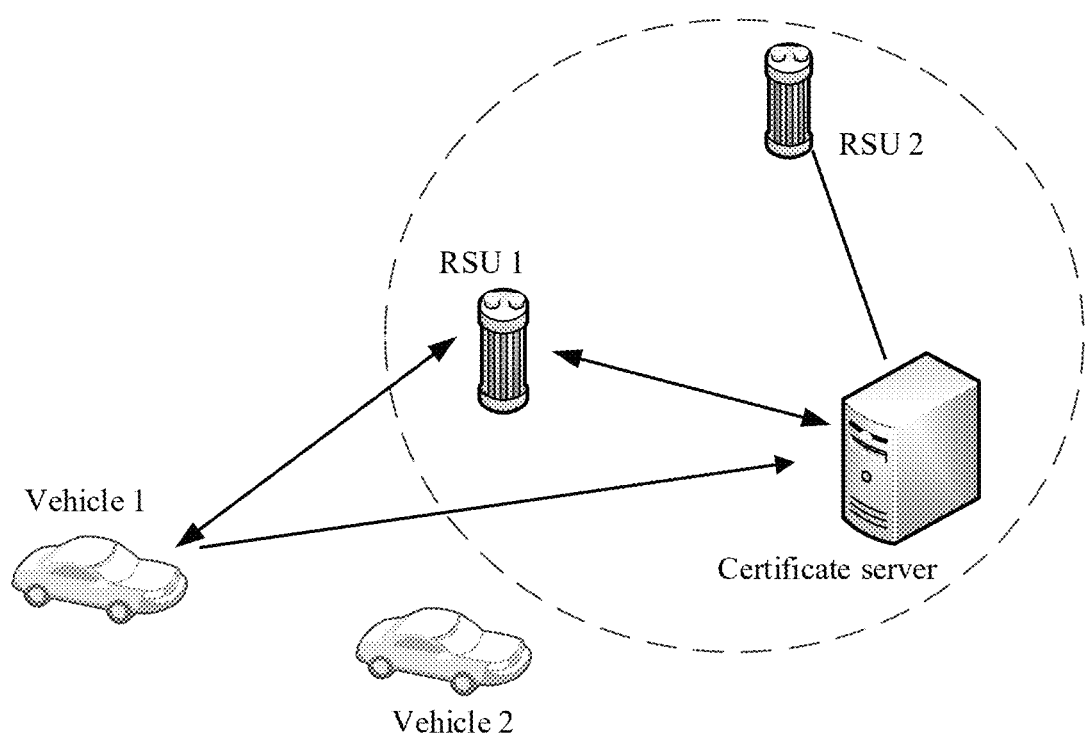
FIG. 1 is a schematic diagram of a structure of an internet of vehicles system according to an embodiment of this application.

FIG. 1 is a schematic diagram of a structure of an internet of vehicles system according to an embodiment of this application. The internet of vehicles system includes at least one vehicle, at least one RSU, and a certificate server. The vehicle may separately communicate with the RSU and the certificate server through an OBU. The OBU enables the vehicle to have a function of receiving and sending a message in the internet of vehicles. FIG. 1 shows only a vehicle 1 and a vehicle 2. The system may further include another vehicle. The RSU may collect messages sent by all vehicles in a coverage area, may send a broadcast message to all vehicles in a coverage area, or the like. The RSU may further communicate with the certificate server. FIG. 1 shows only an RSU 1 and an RSU 2. The system may further include another RSU. The certificate server may include a certificate authority (CA), a certificate management platform, and the like. The CA or the certificate management platform is a certificate authority that issues a certificate to a vehicle. In addition, the at least one RSU and the certificate server may constitute a certificate revocation list updating system, and may be configured to provide a driving service for the vehicle, for example, update a certificate revocation list stored in the OBU.

In an internet of vehicles environment, information exchange occurs only between vehicles that are at a specific distance. This means that information exchange may never occur between many vehicles. Therefore, it is meaningless for an OBU of each vehicle to store an entire-network CRL related to the vehicle. Currently, that a CRL is delivered in the internet of vehicles mainly includes the following. First, the OBU requests a CRL from the certificate server. However, a frequency of requesting the CRL cannot be determined. If an interval for requesting the CRL is extremely short, signaling overheads are increased, and load on the certificate server is increased. If an interval for requesting the CRL is extremely short, the OBU cannot identify a revoked certificate in a timely manner. Second, the certificate server pushes the CRL to the OBU. However, in this manner, if the OBU does not receive the CRL pushed by the certificate server due to a signal problem, the OBU needs to wait for a next CRL pushed by the certificate server. As a result, the OBU cannot identify a revoked certificate in a timely manner. To resolve the foregoing technical problems, embodiments of this application provide the following solutions.

Figure 2:
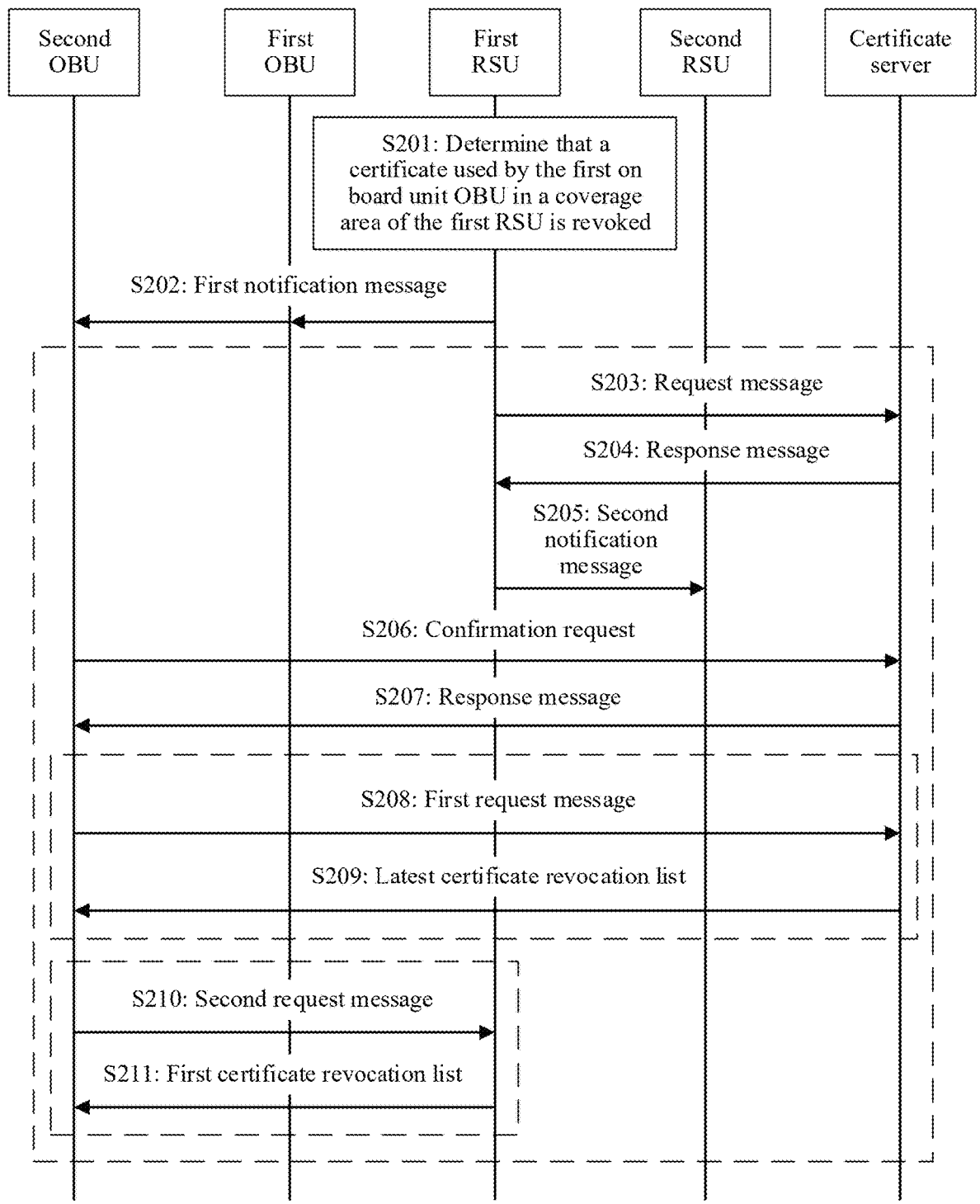
FIG. 2 is a schematic flowchart of a certificate revocation list updating method according to an embodiment of this application.

FIG. 2 is a schematic flowchart of a certificate revocation list updating method according to an embodiment of this application. The method includes but is not limited to the following steps.

S201: A first road side unit RSU determines, based on a first certificate revocation list stored by the first RSU, that a certificate used by a first OBU in a coverage area of the first RSU is revoked.

In an example, the first RSU may receive a message sent by the first OBU, and determine whether a certificate used for the message is one of at least one certificate corresponding to the first certificate revocation list stored by the RSU, for example, determine whether an identifier of the certificate used for the message is in the first certificate revocation list stored by the RSU. When the certificate used for the message is one of the at least one certificate corresponding to the first certificate revocation list, the first RSU determines that the certificate used by the first OBU is revoked; or when the certificate used for the message is not one of the at least one certificate corresponding to the first certificate revocation list, the first RSU determines that the certificate used by the first OBU is not revoked. For each message sent by the first OBU, the first RSU may determine whether the certificate used by the first OBU is revoked. The message may include any message sent by the first OBU, for example, a basic security message (BSM) or a request message. Revocation may also be referred to as withdrawing.

Optionally, if the first RSU determines that the certificate used for the message sent by the first OBU does not belong to the first certificate revocation list stored by the first RSU, the first RSU may continue to receive the message sent by the first OBU. The first RSU does not check, within a preset time period, the certificate used for the message sent by the first OBU, and checks, after the preset time period elapses, the certificate used for the message sent by the first OBU.

Optionally, the first RSU may receive the first certificate revocation list from a certificate server, or request the first certificate revocation list from a certificate server based on preset duration, and store the first certificate revocation list. The first certificate revocation list may be a certificate revocation list in an entire network, or may be a certificate revocation list in an area (for example, a city or an administrative region) in which the first RSU is located. Because a quantity of RSUs is much less than a quantity of OBUs, the preset duration may be set to a small value. In this way, a certificate revocation list stored in the RSU can be updated in a timely manner. In addition, in an area, only one RSU may request a CRL from the certificate server, and distribute the CRL received by the RSU to another RSU in the area. In this way, load on the certificate server is reduced.

Optionally, before the first RSU determines, based on the first certificate revocation list stored by the first RSU, that the certificate used by the first OBU in the coverage area of the first RSU is revoked, the first OBU may broadcast a basic security message to the outside, and the first RSU may receive the basic security message broadcast by the first OBU and determine whether a certificate used for the basic security message is revoked. The basic security message may include a traveling location, a direction, a speed, and the like of a vehicle to which the first OBU belongs.

S202. The first RSU sends a first notification message to one or more OBUs in the coverage area of the first RSU, where the first notification message is used to notify the one or more OBUs to update a certificate revocation list.

In an example, the first RSU may store a certificate revocation list in an entire network, and may obtain a certificate revocation list stored in the one or more OBUs in the coverage area of the first RSU. When the first RSU determines that the certificate used for the message is one of at least one certificate corresponding to the first certificate revocation list and that the certificate used for the message is not in a certificate revocation list stored in a second OBU, the first RSU may send the first notification message to the second OBU. Alternatively, when the first RSU determines that the certificate used for the message is one of at least one certificate corresponding to the first certificate revocation list and that the certificate used for the message is in a certificate revocation list stored in a second OBU, the first RSU may not need to send the first notification message to the second OBU. The second OBU is located in the coverage area of the first RSU.

In this embodiment of this application, after receiving the first notification message, the OBU may update a currently stored certificate revocation list in the following several manners.

In an implementation, the first notification message includes the first certificate revocation list, and the first certificate revocation list is used to update a second certificate revocation list stored by the one or more OBUs. After receiving the first notification message, the OBU may update the currently stored certificate revocation list to the first certificate revocation list. The first notification message may be a broadcast message, and the one or more OBUs may include all OBUs in the coverage area of the first RSU, or may include some OBUs in the coverage area of the first RSU. Optionally, before sending the first notification message, the first RSU may sign the first certificate revocation list by using a certificate of the first RSU.

In another implementation, the first notification message is used to trigger the one or more OBUs to request a latest certificate revocation list from the certificate server. The first notification message does not include the first certificate revocation list. As shown in FIG. 2, in this case, the OBU may update the currently stored certificate revocation list in the following two manners.

Manner 1:
S208: After receiving the first notification message, the OBU sends a first request message to the certificate server.
S209: The OBU receives a latest certificate revocation list from the certificate server, and updates the currently stored certificate revocation list to the latest certificate revocation list.

Manner 2:
S210: The OBU sends a second request message to the first RSU.
S211: The OBU receives a first certificate revocation list from the first RSU, and updates the currently stored certificate revocation list to the first certificate revocation list, where the first certificate revocation list may be a certificate revocation list signed by using a certificate of the first RSU.

It should be noted that the OBU may store only a certificate revocation list in an area (for example, a city or an administrative region) in which the OBU is located, and does not need to store a certificate revocation list in an entire network. Each time the OBU update a certificate revocation list, the OBU only needs to request to update the certificate revocation list in the area. In this way, storage overheads can be reduced, and a query speed can be improved.

Optionally, as shown in FIG. 2, before the OBU requests the certificate revocation list from the certificate server or the first RSU, the OBU may further perform the following operations.

S206: The second OBU sends a confirmation request to the certificate server, where the confirmation request is used to request the certificate server to confirm whether the certificate used by the first OBU is revoked.
S207: The second OBU receives a response message sent by the certificate server. If the second OBU determines that the certificate used by the first OBU is revoked, the second OBU starts to update the currently stored certificate revocation list. If the second OBU determines that the certificate used by the first OBU is not revoked, the second OBU does not need to update the currently stored certificate revocation list. Optionally, the certificate server may sign the response message by using a certificate of the certificate server (for example, a certificate of a CA).

Optionally, as shown in FIG. 2, the method in this embodiment of this application may further include the following step.

S205: The first RSU may send a second notification message to a second RSU, where the second notification message is used to indicate to the second RSU that the certificate used by the first OBU is revoked, where the second notification message may include the revoked certificate of the first OBU. After receiving the second notification message, the second RSU may learn that the certificate used by the first OBU is revoked, determine that a vehicle to which the first OBU belongs is an unauthorized vehicle, and stop exchanging information with the vehicle. The second RSU and the first RSU may be in a same area (for example, a city or an administrative region), or may be in different areas.

It should be noted that an execution sequence of step S205 and step S202 is not limited. After determining that the certificate used by the first OBU in the coverage area of the first RSU is revoked, the first RSU may first send the first notification message, and then send the second notification message, or the first RSU may first send the second notification message, and then send the first notification message.

Optionally, as shown in FIG. 2, before the first RSU may send the second notification message to the second RSU, the method in this embodiment of this application may further include the following steps.

S203: The first RSU sends a request message to the certificate server. After receiving the request message, the certificate server searches for another certificate related to the revoked certificate of the first OBU.
S204: The first RSU receives a response message sent by the certificate server, where the response message includes the other certificate related to the revoked certificate of the first OBU. In this way, the second notification message may further include the other certificate related to the revoked certificate of the first OBU. After receiving the second notification message, another RSU may learn that the certificate used by the first OBU and the other certificate related to the certificate is revoked.

It should be noted that, after receiving a message sent by an OBU in an area in which the OBU is located, if the first RSU determines that a certificate used for the message is revoked, the first RSU sends a notification message to the OBU in the area, to trigger the OBU in the area to update a certificate revocation list. Alternatively, the first RSU may broadcast a latest certificate revocation list to the OBU in the area at a preset time interval without triggering, so that the OBU in the area updates a certificate revocation list. In this embodiment of this application, the OBU may update the certificate revocation list in the foregoing two manners. The preset time interval may be set to a large value, so that signaling overheads can be reduced.

In this embodiment of this application, after receiving the message sent by the OBU in the area, if the first RSU determines that the certificate used for the message is revoked, the first RSU sends the notification message to the OBU in the area, to trigger the OBU in the area to update the certificate revocation list. In this triggering manner, the OBU is notified to update the certificate revocation list, so that timely updating of the certificate revocation list can be ensured, and signaling overheads can also be reduced.

The foregoing describes in detail the method in embodiments of this application. The following provides apparatuses in embodiments of this application.

Figure 3:
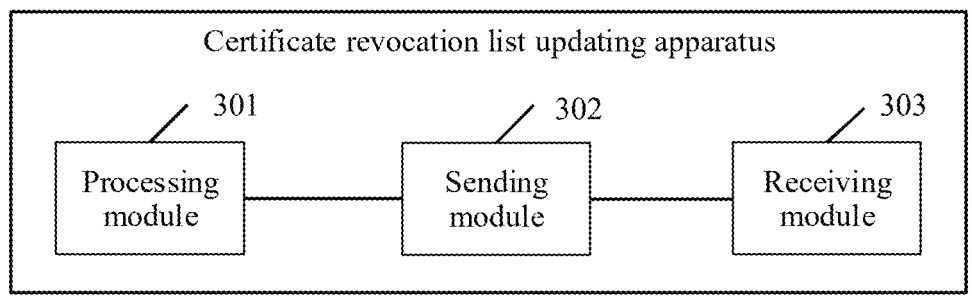
FIG. 3 is a schematic diagram of a structure of a certificate revocation list updating apparatus according to an embodiment of this application.

FIG. 3 is a schematic diagram of a structure of a certificate revocation list updating apparatus according to an embodiment of this application. The apparatus includes a processing module 301, a sending module 302, and a receiving module 303.

The processing module 301 is configured to determine, based on a first certificate revocation list stored by a first RSU, that a certificate used by a first OBU in a coverage area of the first RSU is revoked.

The sending module 302 is configured to send a first notification message to one or more OBUs in the coverage area of the first RSU, where the first notification message is used to notify the one or more OBUs to update a certificate revocation list.

The first notification message includes the first certificate revocation list, and the first certificate revocation list is used to update a second certificate revocation list stored by the one or more OBUs.

The first notification message is used to trigger the one or more OBUs to request a latest certificate revocation list from a certificate server.

Optionally, the receiving module 303 is configured to receive a message sent by the first OBU. The processing module 301 is further configured to, when a certificate used for the message is one of at least one certificate corresponding to the first certificate revocation list, determine that the certificate used by the first OBU is revoked.

Optionally, the receiving module 303 is configured to receive the first certificate revocation list from the certificate server.

Optionally, the sending module 302 is further configured to send a second notification message to a second RSU, where the second notification message is used to indicate to the second RSU that the certificate used by the first OBU is revoked.

Optionally, the sending module 302 is further configured to send a request message to the certificate server. The receiving module 303 is configured to receive a response message sent by the certificate server, where the response message includes another certificate related to the revoked certificate of the first OBU.

It should be noted that, for implementations of the modules, refer to corresponding descriptions in the method embodiment shown in FIG. 2. The modules perform the method and functions performed by the first RSU in the foregoing embodiment.

Figure 4:
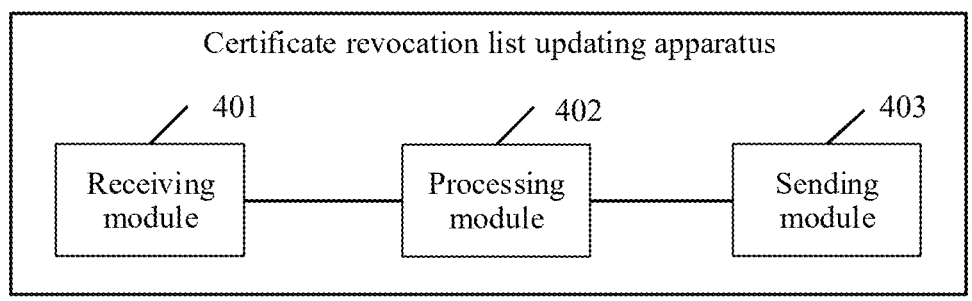
FIG. 4 is a schematic diagram of a structure of a certificate revocation list updating apparatus according to an embodiment of this application.

FIG. 4 is a schematic diagram of a structure of a certificate revocation list updating apparatus according to an embodiment of this application. The apparatus includes a receiving module 401, a processing module 402, and a sending module 403.

The receiving module 401 is configured to receive a first notification message sent by a first road side unit RSU, where the first notification message is used to indicate to update a certificate revocation list.

The processing module 402 is configured to update the certificate revocation list.

Optionally, the first notification message includes a first certificate revocation list. The processing module 402 is further configured to update a currently stored certificate revocation list to the first certificate revocation list.

Optionally, the sending module 403 is configured to send a first request message to a certificate server. The receiving module 401 is further configured to receive a latest certificate revocation list from the certificate server. The processing module 402 is further configured to update a currently stored certificate revocation list to the latest certificate revocation list.

Optionally, the sending module 403 is configured to send a second request message to the first RSU. The receiving module 401 is further configured to receive a first certificate revocation list from the first RSU. The processing module 402 is further configured to update a currently stored certificate revocation list to the first certificate revocation list.

Optionally, the sending module 403 is configured to send a confirmation request to the certificate server, where the confirmation request is used to request the certificate server to confirm whether a certificate used by a first OBU is revoked. The receiving module 401 is further configured to receive a response message sent by the certificate server.

It should be noted that, for implementations of the modules, refer to corresponding descriptions in the method embodiment shown in FIG. 2. The modules perform the method and functions performed by the OBU in the foregoing embodiment.

Figure 5:
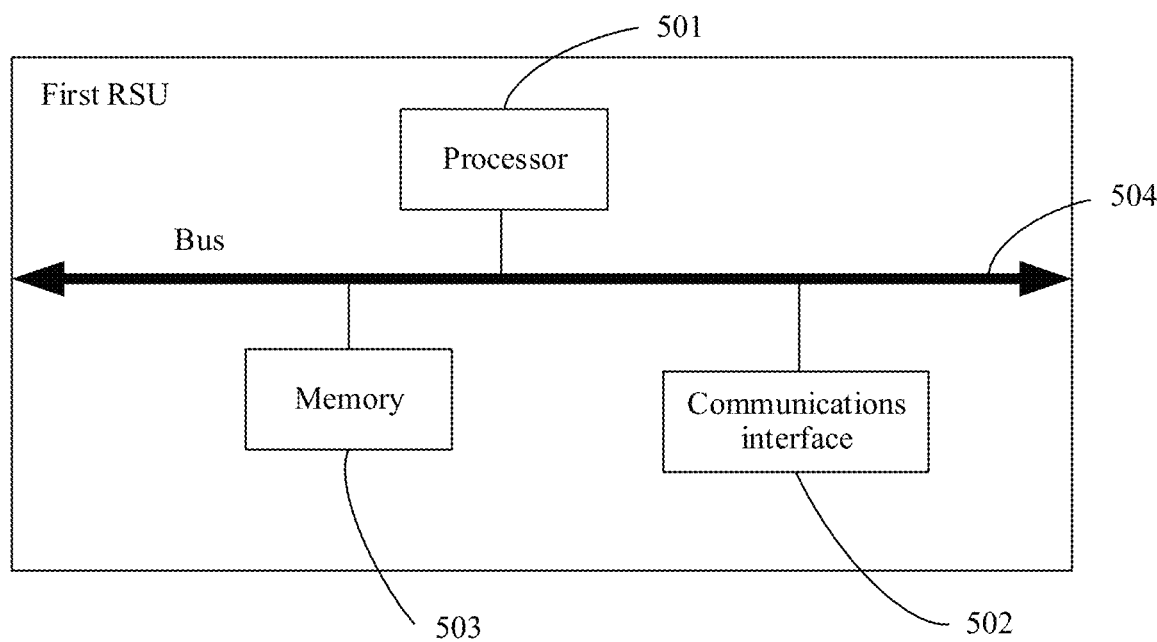
FIG. 5 is a schematic diagram of a structure of a first RSU according to an embodiment of this application.

FIG. 5 is a schematic diagram of a structure of a first RSU according to an embodiment of this application. As shown in FIG. 5, the first RSU may include at least one processor 501, at least one communications interface 502, at least one memory 503, and at least one communications bus 504.

The processor 501 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. The processor may alternatively be a combination for implementing a computing function, for example, a combination including one or more microprocessors, or a combination of a digital signal processor and a microprocessor. The communications bus 504 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 5, but this does not mean that there is only one bus or only one type of bus. The communications bus 504 is configured to implement connection and communication between these components. The communications interface 502 of the device in this embodiment of this application is configured to perform signaling or data communication with another node device. The memory 503 may include a volatile memory, for example, a non-volatile dynamic random-access memory (NVRAM), a phase-change random-access memory (PRAM), or a magnetoresistive random-access memory (MRAM). The memory may further include a nonvolatile memory, for example, at least one magnetic disk storage device, an electrically erasable programmable read-only memory (EEPROM), a flash storage device such as a NOR flash memory or a NAND flash memory, or a semi-conductor device such as a solid-state drive (SSD). Optionally, the memory 503 may be at least one storage apparatus far from the processor 501. Optionally, the memory 503 may further store a group of program code. Optionally, the processor 501 may further execute a program stored in the memory 503, to perform the following operation steps such as determining, based on a first certificate revocation list stored by the first RSU, that a certificate used by a first OBU in a coverage area of the first RSU is revoked; and sending a first notification message to one or more OBUs in the coverage area of the first RSU, where the first notification message is used to notify the one or more OBUs to update a certificate revocation list.

The first notification message includes the first certificate revocation list, and the first certificate revocation list is used to update a second certificate revocation list stored by the one or more OBUs.

The first notification message is used to trigger the one or more OBUs to request a latest certificate revocation list from a certificate server.

Optionally, the processor 501 is configured to perform the following operation steps such as receiving a message sent by the first OBU; and when a certificate used for the message is one of at least one certificate corresponding to the first certificate revocation list, determining that the certificate used by the first OBU is revoked.

Optionally, the processor 501 is configured to perform the following operation step such as receiving the first certificate revocation list from the certificate server.

Optionally, the processor 501 is configured to perform the following operation step such as sending a second notification message to a second RSU, where the second notification message is used to indicate to the second RSU that the certificate used by the first OBU is revoked.

Optionally, the processor 501 is configured to perform the following operation steps such as sending a request message to the certificate server; and receiving a response message sent by the certificate server, where the response message includes another certificate related to the revoked certificate of the first OBU.

The processor may further cooperate with the memory and the communications interface to perform the operations of the first RSU in the foregoing embodiments of this application.

Figure 6:
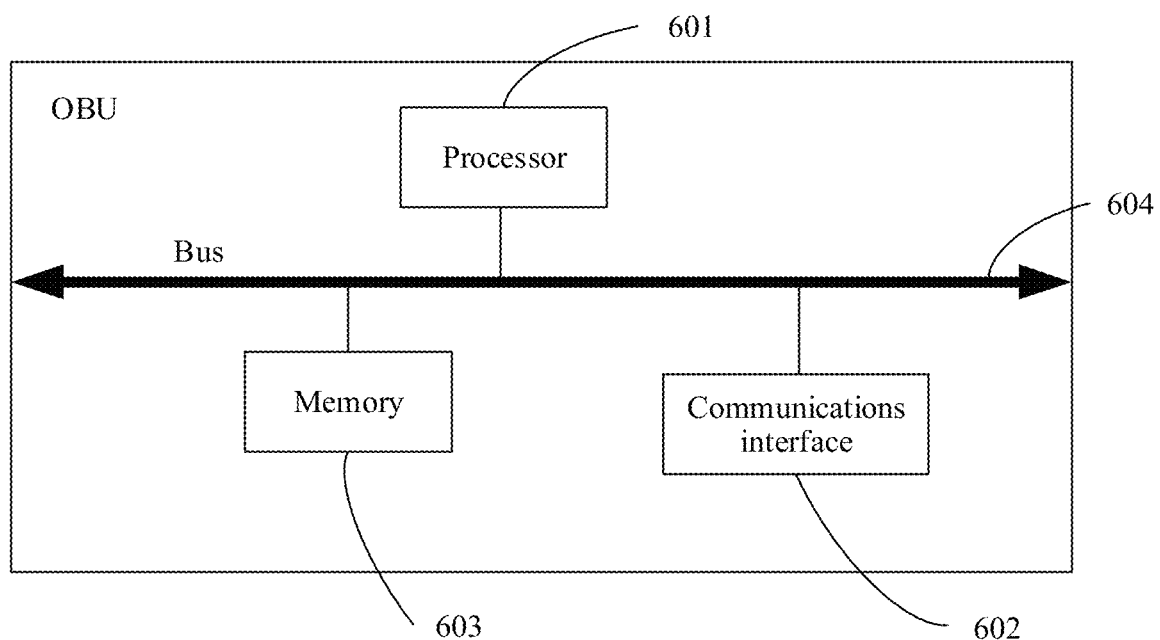
FIG. 6 is a schematic diagram of a structure of an OBU according to an embodiment of this application.

FIG. 6 is a schematic diagram of a structure of an OBU according to an embodiment of this application. A vehicle may communicate with a certificate server and a road side unit in the internet of vehicles through the OBU. As shown in the figure, the OBU may include at least one processor 601, at least one communications interface 602, at least one memory 603, and at least one communications bus 604.

The processor 601 may be processors of different types mentioned above. The communications bus 604 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 6, but this does not mean that there is only one bus or only one type of bus. The communications bus 604 is configured to implement connection and communication between these components. The communications interface 602 of the device in this embodiment of this application is configured to perform signaling or data communication with another node device. The memory 603 may be memories of different types mentioned above. Optionally, the memory 603 may be at least one storage apparatus far from the processor 601. The memory 603 stores a group of program code, and the processor 601 executes a program in the memory 603, to perform the following operation steps such as receiving, a first notification message sent by a first road side unit RSU, where the first notification message is used to indicate to update a certificate revocation list; and updating the certificate revocation list.

Optionally, the processor 601 is configured to perform the following operation step such as updating the certificate revocation list that includes updating a currently stored certificate revocation list to a first certificate revocation list.

Optionally, the processor 601 is configured to perform the following operation steps such as sending a first request message to the certificate server; receiving a latest certificate revocation list from the certificate server; and updating a currently stored certificate revocation list to the latest certificate revocation list.

Optionally, the processor 601 is configured to perform the following operation steps such as sending a second request message to the first RSU; receiving a first certificate revocation list from the first RSU; and updating a currently stored certificate revocation list to the first certificate revocation list.

Optionally, the processor 601 is configured to perform the following operation steps such as sending a confirmation request to the certificate server, where the confirmation request is used to request the certificate server to confirm whether a certificate used by a first OBU is revoked; and receiving a response message sent by the certificate server.

The processor may further cooperate with the memory and the communications interface to perform the operations of the OBU in the foregoing embodiments of this application.

An embodiment of this application further provides a chip system. The chip system includes a processor, configured to support a first RSU or an OBU in implementing a function in any one of the foregoing embodiments, for example, generating or processing data and/or information in the foregoing methods. In a possible design, the chip system may further include a memory. The memory is configured to store program instructions and data that are used for the first RSU or the OBU. The chip system may include a chip, or may include a chip and another discrete device.

An embodiment of this application further provides a processor, configured to be coupled to a memory, and configured to perform any method and function of the first RSU or the OBU in any one of the foregoing embodiments.

An embodiment of this application further provides a computer program product including instructions. When the computer program product runs on a computer, the computer is enabled to perform any method and function of the first RSU or the OBU in any one of the foregoing embodiments.

An embodiment of this application further provides an apparatus, configured to perform any method and function of the first RSU or the OBU in any one of the foregoing embodiments.

An embodiment of this application further provides a wireless communications system. The system includes at least one first RSU and at least one OBU in any one of the foregoing embodiments.

All or some of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive (SSD)), or the like.

What is claimed is:

1. An on board unit (OBU), comprising:
   at least one processor; and
   one or more memories coupled to the at least one processor and storing program instructions that when executed by the at least one processor cause the OBU to be configured to:
   receive a first notification message from a first road side unit (RSU), wherein the first notification message comprises a first certificate revocation list, and wherein the first notification message instructs the OBU to update a currently stored certificate revocation list within a coverage area of the first RSU;
   send a confirmation request to a certificate server, wherein the confirmation request requests confirmation from the certificate server whether a certificate used by the OBU within the coverage area of the first RSU is revoked;
   receive a response message from the certificate server in response to the confirmation request; and
   update the currently stored certificate revocation list to the first certificate revocation list in response to the first notification message.

2. The OBU of claim 1, wherein the program instructions further cause first OBU to be configured to:
   send a first request message to the certificate server;
   receive a latest certificate revocation list from the certificate server in response to the first request message; and
   update the currently stored certificate revocation list to the latest certificate revocation list.

3. The OBU of claim 1, wherein the program instructions further cause first OBU to be configured to:
   send a second request message to the first RSU;
   receive the first certificate revocation list from the first RSU in response to the second request message; and
   update the currently stored certificate revocation list to the first certificate revocation list.

4. The OBU of claim 1, wherein the first notification message triggers the OBU to request a latest certificate revocation list from the certificate server.

5. The OBU of claim 1, wherein the program instructions further cause the OBU to be configured to send a message to the first RSU that instructs the first RSU to determine that the certificate is revoked when the certificate used for the message is a second certificate corresponding to the currently stored certificate revocation list.

6. A certificate revocation list updating method, comprising:
   receiving, by an on board unit (OBU), a first notification message from a first road side unit (RSU), wherein the first notification message comprises a first certificate revocation list, and wherein the first notification message instructs the OBU to update a currently stored certificate revocation list within a coverage area of the first RSU;
   sending, by the OBU, a confirmation request to a certificate server, wherein the confirmation request requests confirmation from the certificate server whether a certificate used by the OBU within the coverage area of the first RSU is revoked;
   receiving, by the OBU, a response message from the certificate server in response to the confirmation request; and
   updating, by the OBU, the currently stored certificate revocation list to the first certificate revocation list in response to the first notification message.

7. The certificate revocation list updating method of claim 6, wherein after the receiving, the certificate revocation list updating method further comprises:
   sending, by the OBU, a first request message to the certificate server;
   receiving, by the OBU, a latest certificate revocation list from the certificate server in response to the first request message; and
   updating, by the OBU, the currently stored certificate revocation list to the latest certificate revocation list.

8. The certificate revocation list updating method of claim 6, wherein after the receiving, by an OBU, the first notification message from the first RSU, the certificate revocation list updating method further comprises:
   sending, by the OBU, a second request message to the first RSU;
   receiving, by the OBU, the first certificate revocation list from the first RSU; and
   the updating, by the OBU, the certificate revocation list comprises updating, by the OBU, the currently stored certificate revocation list to the first certificate revocation list.

9. The certificate revocation list updating method of claim 6, further comprising triggering the OBU to request a latest certificate revocation list from the certificate server when the first notification message is received.

10. The certificate revocation list updating method of claim 6, further comprising sending a message to the first RSU that instructs the first RSU to determine that the certificate is revoked when the certificate used for the message is a second certificate corresponding to the currently stored certificate revocation list.

11. A computer program product comprising program instructions stored on one or more memories and that, when executed by at least one processor, cause an on board unit (OBU) to be configured to:
    receive a first notification message from a first road side unit (RSU), wherein the first notification message comprises a first certificate revocation list, and wherein the first notification message instructs the OBU to update a currently stored certificate revocation list within a coverage area of the first RSU;
    send a confirmation request to a certificate server, wherein the confirmation request requests confirmation from the certificate server whether a certificate used by the OBU within the coverage area of the first RSU is revoked;
    receive a response message from the certificate server in response to the confirmation request; and
    update the currently stored certificate revocation list to the first certificate revocation list in response to the first notification message.

12. The computer program product of claim 11, wherein the program instructions that when executed by the at least one processor further cause the OBU to be configured to:
    send a first request message to the certificate server;
    receive a latest certificate revocation list from the certificate server in response to the first request message; and
    update the currently stored certificate revocation list to the latest certificate revocation list.

13. The computer program product of claim 11, wherein the program instructions that when executed by the at least one processor further cause the OBU to be configured to:
    send a second request message to the first RSU;
    receive the first certificate revocation list from the first RSU in response to the second request message; and
    update the currently stored certificate revocation list to the first certificate revocation list.

14. The computer program product of claim 11, wherein the first notification message triggers the OBU to request a latest certificate revocation list from the certificate server.

15. The computer program product of claim 11, wherein the program instructions that when executed by the at least one processor further cause the OBU to be configured to send a message to the first RSU that instructs the first RSU to determine that the certificate is revoked when the certificate used for the message is a second certificate corresponding to a second certificate revocation list.

* * * * *